United States Patent [19]
Rentfrow et al.

[11] Patent Number: 5,755,365
[45] Date of Patent: May 26, 1998

[54] SPARE TIRE CARRIER FOR TOWABLE TRAILERS

[75] Inventors: John D. Rentfrow, Three Rivers, Mich.; Paul B. Kellner, Mishawaka, Ind.

[73] Assignee: Jayco, Inc., Middlebury, Ind.

[21] Appl. No.: 753,402

[22] Filed: Nov. 25, 1996

[51] Int. Cl.$^6$ .................................................. B62D 43/04
[52] U.S. Cl. ........................................ 224/42.23; 224/42.21
[58] Field of Search ........................... 224/42.23, 42.21, 224/504–6

[56] References Cited

U.S. PATENT DOCUMENTS

| | | | |
|---|---|---|---|
| 1,813,094 | 7/1931 | Appel | 224/42.23 |
| 3,554,415 | 1/1971 | Woods | 224/42.23 X |
| 4,964,552 | 10/1990 | Terwilliger | 224/42.23 |
| 5,027,991 | 7/1991 | Braddock | 224/42.23 |

FOREIGN PATENT DOCUMENTS

| | | | |
|---|---|---|---|
| 201414 | 11/1986 | European Pat. Off. | 224/42.23 |
| 3901960 | 7/1990 | Germany | 224/42.23 |

*Primary Examiner*—Renee S. Luebke
*Attorney, Agent, or Firm*—Baker & Daniels

[57] ABSTRACT

A tire carrier for carrying spare tires on vehicles such as towable trailers, pop-up campers, and similar vehicles. The tire carrier of the present invention includes a subframe that is pivotably attached to the frame of the trailer, and the subframe is moveable between a raised storage or travel position and a lowered readily accessible load position. The subframe preferably includes a wing nut or similar retaining bar that threads onto a threaded rod in order to clamp the spare tire to the subframe. The tire carrier also includes a convenient spring loaded handle attached to the subframe for raising and lowering the subframe between the storage and load positions. Finally, the handle includes a portion which engages the frame of the trailer in order to secure the subframe in the raised position while the trailer is traveling.

35 Claims, 9 Drawing Sheets

SPARE TIRE CARRIER FOR TOWABLE TRAILERS

The present invention relates generally to a spare tire carrier for attachment to towable trailers such as travel trailers, campers, boat trailers and similar towable trailers.

BACKGROUND OF THE INVENTION

A flat tire on a motorhome, travel trailer, camper, boat trailer, or utility trailer may be catastrophic. Unless the owner carriers a spare tire, the trailer, including all of the recreational equipment, camping gear, tools, work equipment, and/or personal effects must be left at the side of the road until the owner can remove the tire, take it to a service station for repair, and return to the trailer for reinstallation. Meanwhile, the trailer and all of the personal property are subject to theft, vandalism, and other possible damage. Accordingly, most trailers include a spare tire.

Because interior space is at a premium in most trailers and motorhomes, the spare tire is usually carried by a tire rack on the outside of the vehicle. For example, many tent campers carry the spare tire on a rear mounted tire rack similar to the tire racks found on conversion vans, while other trailers carry the spare tire underneath the trailer on a frame mounted sling similar to the racks found on many pickup trucks. Unfortunately, the most secure racks are usually not readily accessible in emergencies, while the most readily accessible racks are not very secure. Many times, the owner of the trailer experiences a great deal of difficulty extracting the tire from the carrier, especially in the dark, in the rain, or in other adverse conditions. Similarly, many people have a difficult time placing the spare tire on the rack to begin with, especially those racks that require the user to lift the tire off the ground or up underneath the frame of the trailer. Many of these tire carriers require the trailer owner to kneel and reach under the frame of the trailer, and in many cases the owner has to crawl on the ground.

Therefore, many tire carriers are designed with ease of accessibility in mind. Unfortunately, easy accessibility for the owner also means easy accessibility for potential thieves. Other times, in the middle of an emergency the owner discovers that the spare tire has been stolen, or the tire has been vandalized and is completely useless.

Accordingly, there exists a need for an improved spare tire carrier that is readily accessible in emergencies and under adverse conditions, and yet that holds the spare tire in a very secure position that deters theft and protects the tire from vandalism and other damage. Such an improved spare tire carrier should also be easy to operate under adverse conditions, should not require the operator to lift the spare tire high off the ground, and yet should provide ready access to the spare tire for servicing and checking the tire. There also exists a need for an improved tire carrier that is readily adaptable to the frame of most towable trailers and that does not require frame alterations or a great deal of customized mounting hardware.

SUMMARY OF THE INVENTION

The spare tire carrier of the present invention facilitates fast and easy storage or removal of a spare tire from the carrier without having to lift the tire off the ground, and yet secures the spare tire in a raised position. The improved spare tire carrier of the present invention also stores the spare tire in a secure raised position which deters both theft and vandalism. The spare tire carrier of the present invention provides ready access to the spare tire and allows the user to quickly and easily store or remove the spare tire from the rack even under adverse conditions, all without having to lift the spare tire off the ground. Finally, the present spare tire carrier is easily retrofitted to existing trailers, and does not require a great deal of customized mounting hardware.

The present invention uses a subframe assembly that is pivotably mounted to the frame of the trailer. The subframe pivots between a raised storage position in which the spare tire is nested within the A-frame at the front of the trailer, and a lowered load position in which the subframe is tilted and has one end resting on the ground. A spring loaded quick release handle attached to the subframe allows the user to manipulate the position of the subframe from above without having to kneel on the ground, and the handle locks securely to the frame to hold the tire rack in the raised position. In the raised position the tire is shielded both by the A-frame of the trailer and by the front portion of the trailer body, thus greatly deterring theft of the spare tire. In fact, extracting the spare tire form the carrier when the carrier is locked in the raised position would be extremely difficult if not impossible.

The handle assembly used to raise and lower the tire carrier is both secure and easy to operate, and includes an integral spring action feature which allows the user to quickly and easily engage or disengage the handle from the frame. The spare tire is secured to the tire mounting area on the subframe using a threaded bolt with a wing nut, which prevents the tire from bouncing around in the tire rack when the trailer is traveling down rough or unimproved roads. Alternatively, the spare tire can be secured to the tire mounting area on the subframe by a cross bar with a resilient piece of material attached to the A-frame directly over the tire.

The subframe attaches to the frame of the trailer by virtue of a pair of positive lock frame hooks, which offer a number of distinct functional advantages. First, the positive lock hooks eliminate the need for hinges, which tend to rust and accumulate dirt, and which require periodic maintenance in order to remain operational. Second, the positive lock hooks hold the subframe securely in place, pivot easily, and cannot be jarred loose when the trailer impacts a bump in the road. Finally, the positive lock hooks can easily be retrofitted to existing trailer frames with the simple addition of a pair of slots in the frame, and the entire rack can be installed or removed without the use of tools. In the event the tire rack is retrofitted to an existing trailer, the user need only add slots to the frame and weld the loop to the battery rack or other supporting member. Thus, the spare tire carrier can be included as an option on new trailers or easily retrofitted to existing trailers.

As stated above, the subframe pivots between a raised storage position and a lowered load position, and the shape and dimensions of the subframe allow the operator to realize a mechanical advantage, and offer a convenient lifting point making it much easier to raise and lower the spare tire. Also, because one end of the subframe is on the ground when in the load position, the operator never has to lift the spare tire entirely off the ground. Instead, the operator can simply slide or roll the tire into place on the subframe, secure or position the tire on the subframe, and then lift the subframe into place.

Accordingly, it is an object of this invention to provide an improved spare tire carrier for trailers or motorhomes that is both easily accessible and secure.

Another object of this invention is to provide a spare tire carrier for trailers that deters theft of the tire and that also protects the spare tire from vandalism or other damage.

A further object of this invention is to provide a spare tire carrier that does not require the operator to lift the spare tire off the ground in order to place the spare tire on the carrier, and that further offers a mechanical advantage when raising the tire carrier to the storage position.

A still further object of this invention is to provide a spare tire carrier for trailers that does not require the operator to crawl under the vehicle in order to load or unload the spare tire from the carrier.

A further object of the invention is to provide a spare tire carrier that does not interfere with the mounting of other vehicle equipment such as batteries and other accessories.

These and other objects of the invention will become readily apparent to those skilled in the art upon a reading of the following description.

BRIEF DESCRIPTION OF THE DRAWINGS

FIG. 2A is a partially exploded view in perspective similar to FIG. 2 but showing the manner of removing the tire hold down bar;

FIG. 6 is an enlargement of the circumscribed portion of FIG. 3 showing the connection between the subframe hangers and the frame of the trailer;

DETAILED DESCRIPTION OF THE INVENTION

The embodiment described herein is not intended to limit the scope of the invention to the precise form disclosed. Rather, the embodiment has been chosen and described to explain the principles of the invention and its application and practical use to best enable others skilled in the art to follow its teachings.

Figure 3:
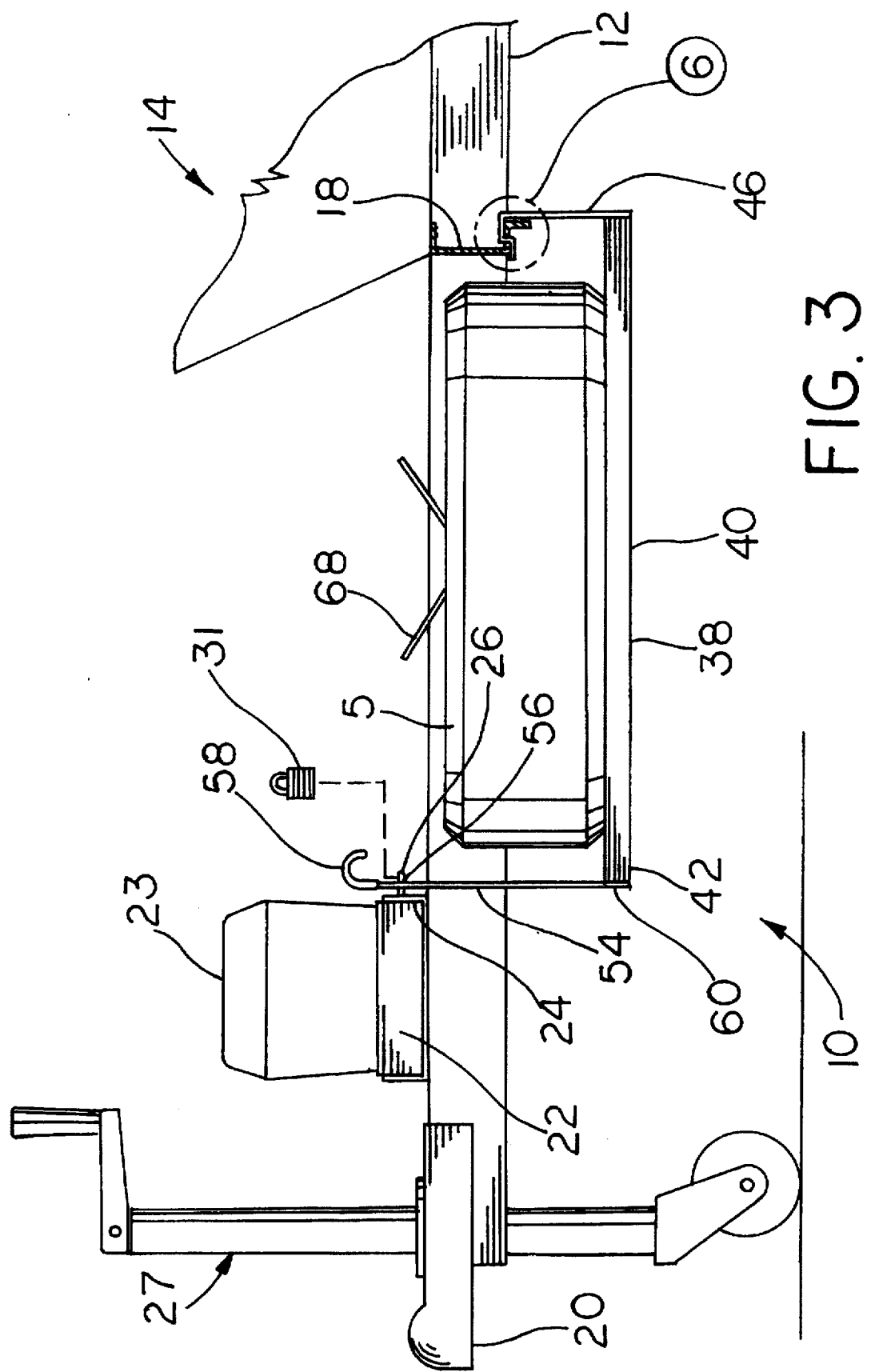
FIG. 3 is a fragmentary elevational view, partly in section, of the spare tire carrier shown in FIG. 1 but with a spare tire shown in place within the carrier and with a portion of the A-frame cut away for clarity.
Figure 4:
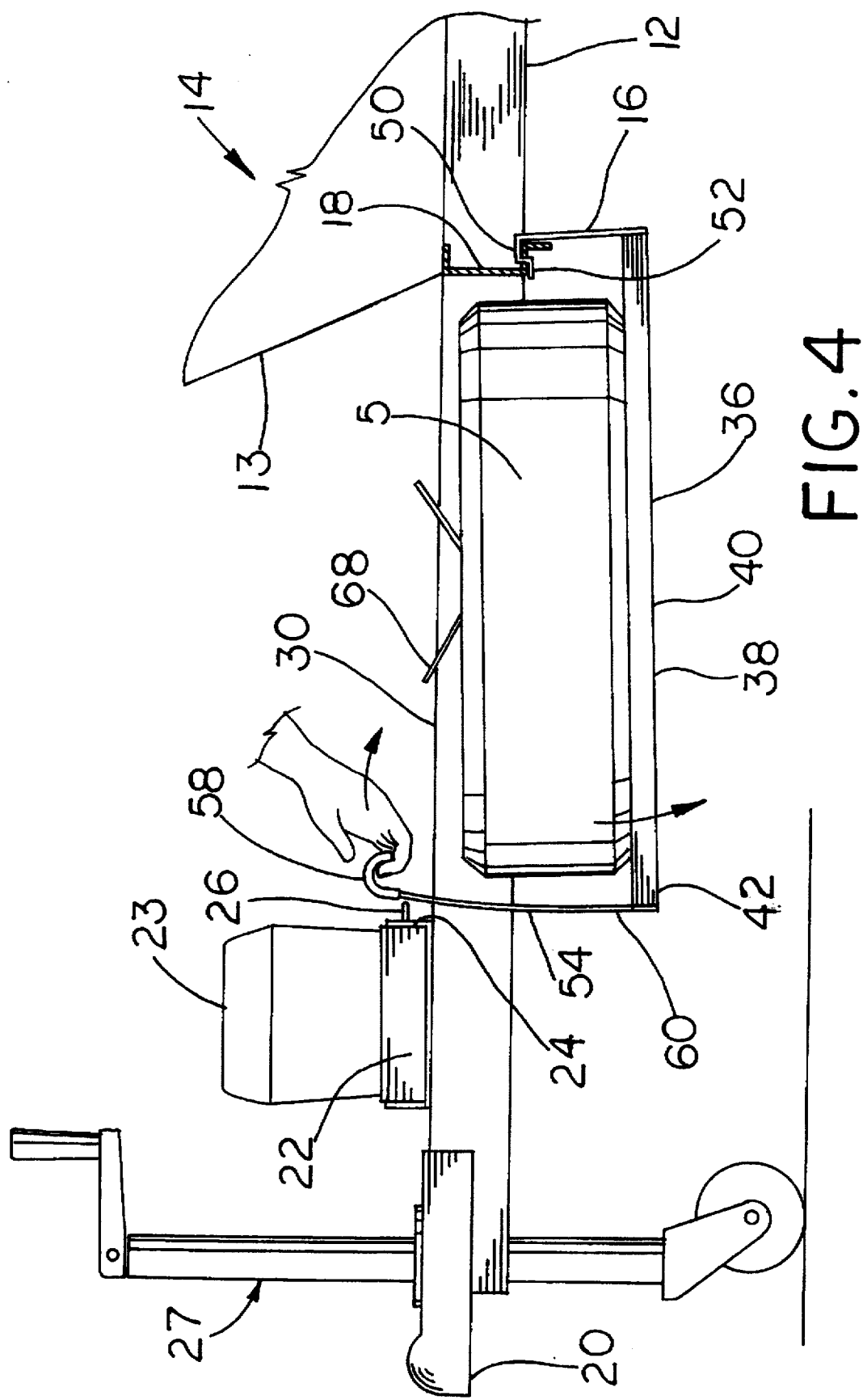
FIG. 4 is a view similar to that shown in FIG. 3, but illustrating the manner by which the handle of the subframe is disengaged from the frame of the trailer.
Figure 5:
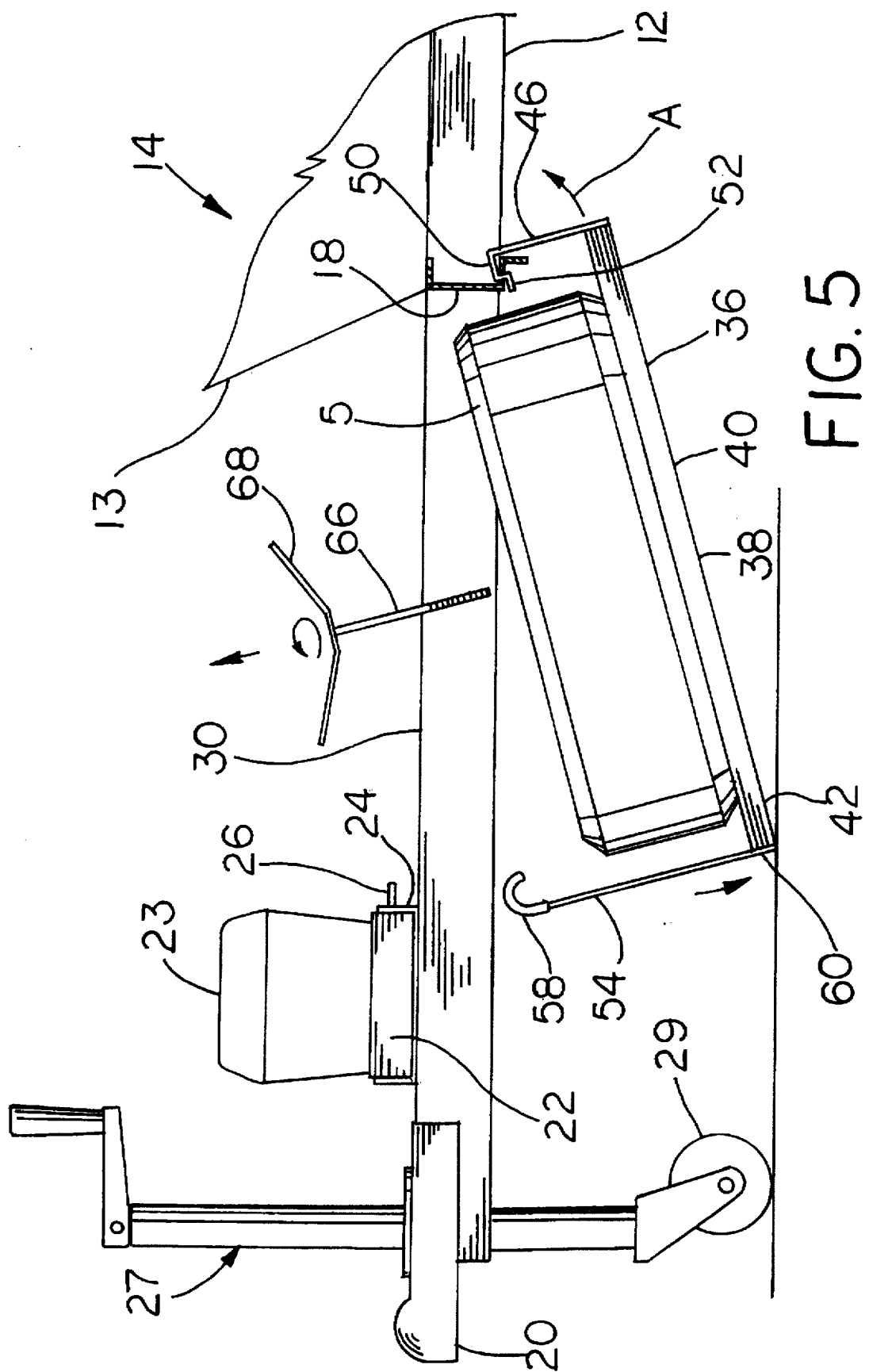
FIG. 5 is a view similar to that shown in FIGS. 3 and 4, but with the subframe lowered to the load position and with the tire hold down bar removed.

Referring now to the drawings, a spare tire carrier according to the present invention generally indicated by the reference numeral 10 is shown attached to the frame 12 of a towable trailer 14. Towable trailer 14 typically includes a shell or body 13 having portable living accommodations. Frame 12 of trailer 14 includes A-frame 16 which is attached to front rail 18 and which extends forward therefrom. As shown in FIG. 6, the cross section of front rail 18 includes an upper vertical portion 19, a horizontal portion 21, and a lower vertical portion 25. A-frame 16 is generally triangular in shape as is common in the industry, and includes hitch 20 and battery rack 22. Hitch 20 typically includes crank assembly 27 and wheel 29 for raising, lowering, and moving trailer 14 when hitch 20 is not connected to a towing vehicle. Battery rack 22 is typically constructed from "L" shaped steel sections defining a nesting area for a battery 23 as shown in FIGS. 3, 4 and 5 as is common in the industry. Battery rack 22 includes rear portion 24 having a projection or hold down loop 26 for securing a battery to rack 22 using a strap (not shown) as is common practice. Typically, loop 26 is bolted, welded, or otherwise secured to a standard battery rack or other supporting member. A-frame 16 includes a pair of side rails 28, 30 which are attached to and extend from front rail 18. Side rails 28, 30 converge and are joined together at hitch 20 to create the triangular shape. Front rail 18 of frame 12 includes a pair of mounting slots 32, 34 as is discussed in greater detail below.

Figure 1:
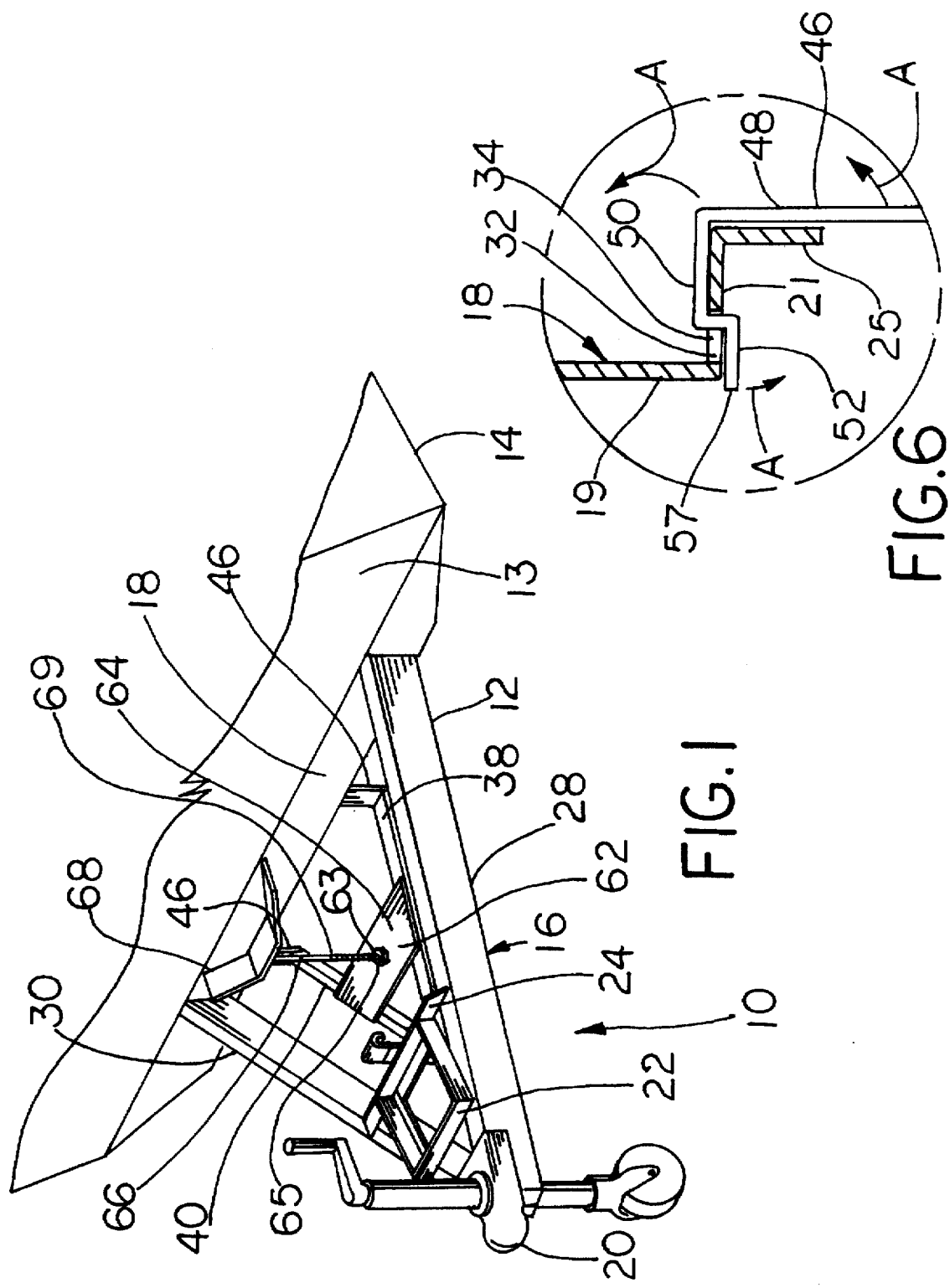
FIG. 1 is a fragmentary view in perspective of a spare tire carrier according to the present invention shown attached to the A-frame of a towable trailer.
Figure 2:
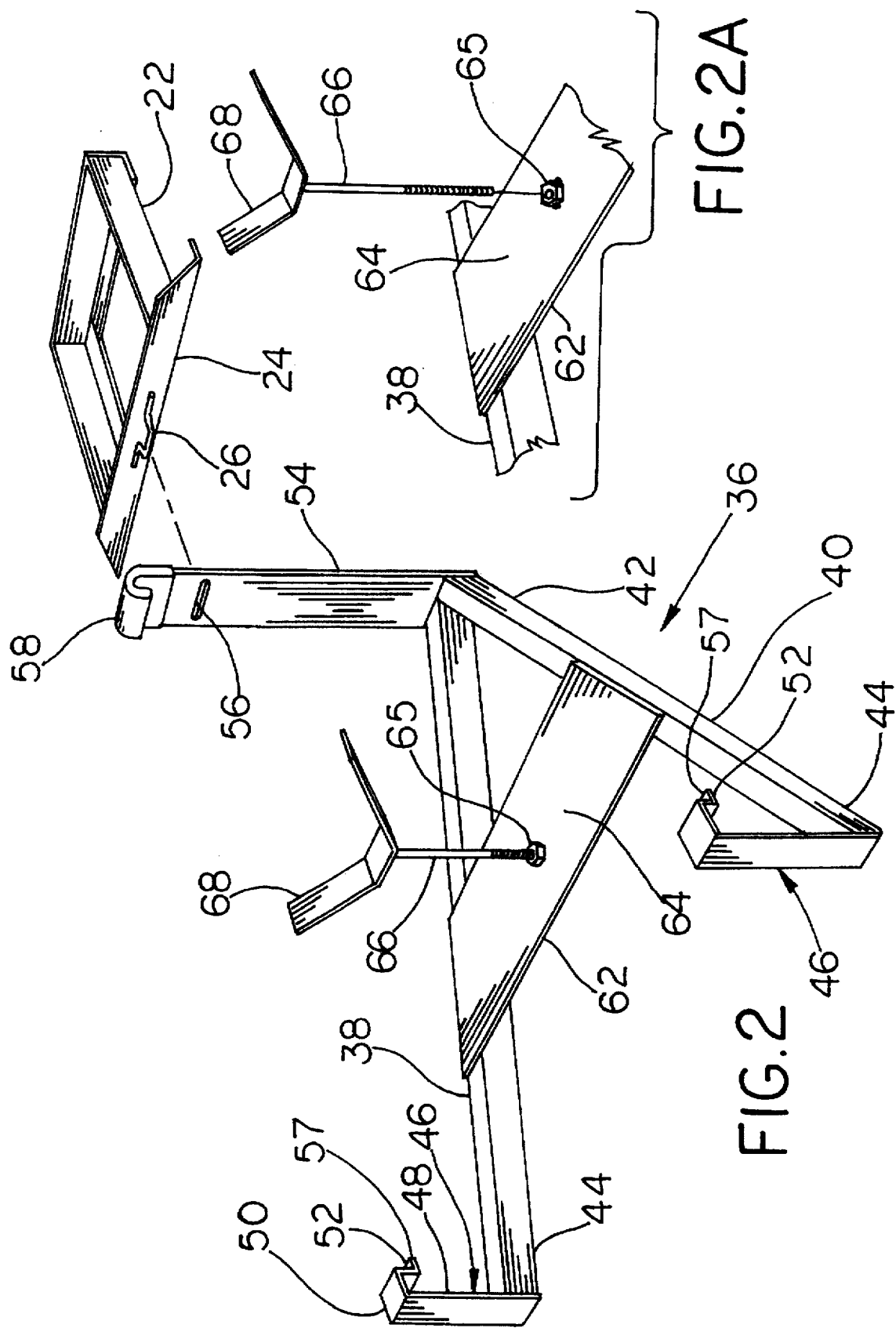
FIG. 2 is a partially exploded detailed view in perspective illustrating the subframe of the present invention, and showing the detail of the latch mechanism between the handle and the frame of the trailer.

Referring now to FIG. 2, subframe 36 includes a pair of side rails 38, 40, each of which includes a forward portion 42 and a rearward portion 44. The forward portions 42 of side rails 38, 40 are joined together, while the rearward portions 44 are spaced apart, so that side rails 38, 40 form a substantially triangular shape which generally complements the triangular shape of A-frame 16. Each side rail 38, 40 has attached to its rearward end 44 a hanger 46 extending vertically upward. Each hanger 46 includes a vertical portion 48, a horizontal support portion 50, and an "L" shaped lip or catch 52. Load bearing portion 50 typically rests on horizontal portion 21 of front rail 18 of frame 12 as shown in FIG. 6, and "L" shaped lip or catch 52 of each hanger 46 is sized to be received in slots 32, 34 of front rail 18 as is discussed in greater detail below. Hangers 46 support the rearward end of subframe 36, yet allow subframe 36 to pivot relative to front rail 18.

Figure 5A:
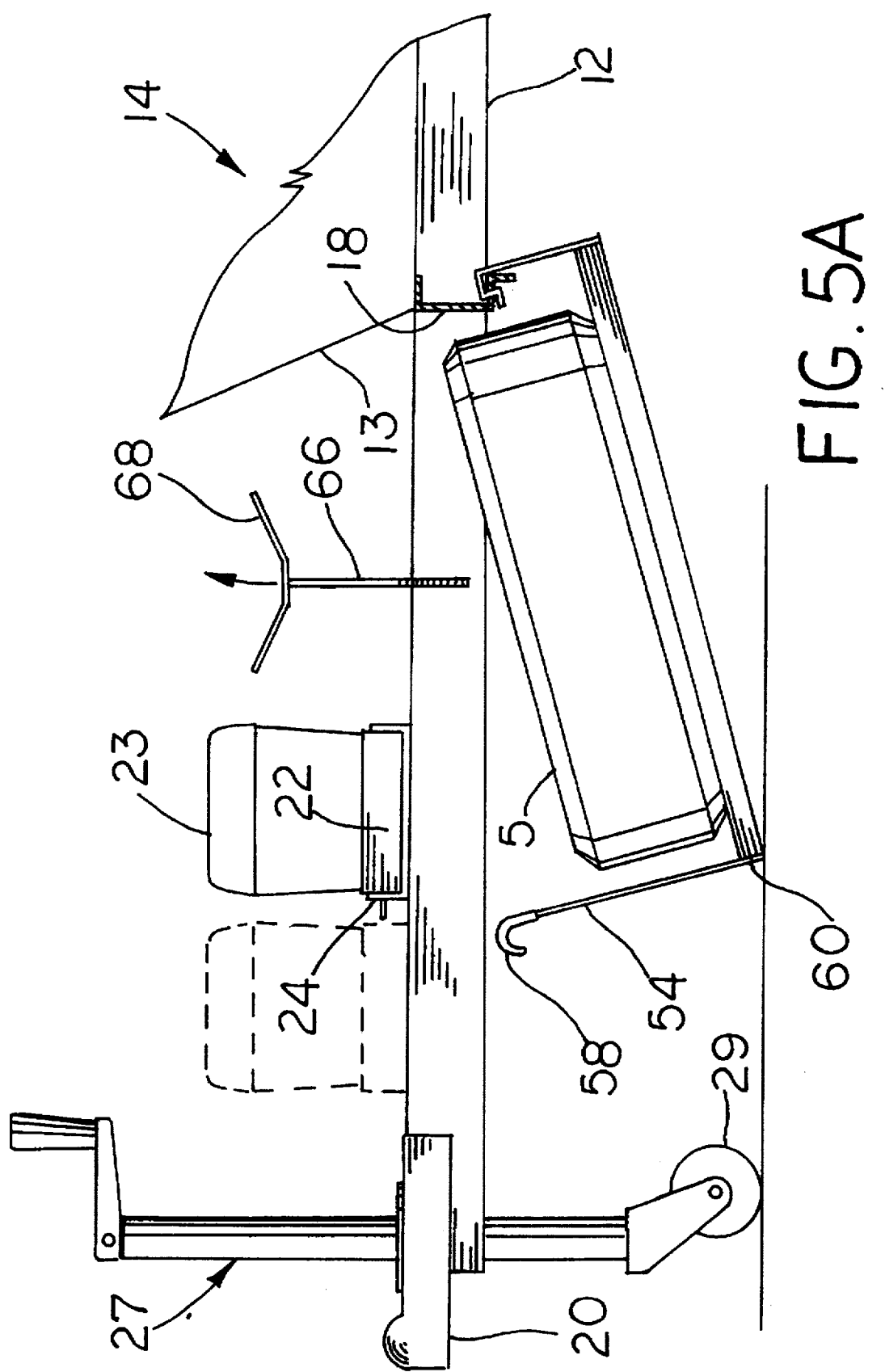
FIG. 5A is a view similar to FIG. 5 but showing an alternate handle arrangement to accommodate trailers having a different battery placement.

Handle 54 is joined to forward ends 42 of side rails 38, 40, and handle 54 includes an aperture or slot 56 and a curved gripping portion 58. Gripping portion 58 preferably includes a resilient coating to provide a more comfortable gripping surface. Depending on the location of the battery rack 22, gripping portion 58 can be curved backward as shown in FIG. 5 or forward as shown in FIG. 5A. Slot 56 in handle 54 is sized to engage loop 26 in rear portion 24 of battery rack 22 as discussed in greater detail below. Bottom portion 60 of handle 54 is rigidly attached to forward ends 42 of side rails 38, 40 by welding or similar means, so that when grip 58 of handle 54 is moved away from the loop 26 towards the rear of trailer 14 as shown in FIG. 4, handle 54 will naturally spring back to its original position when released. Alternatively, a pivot pin with an external spring may be used. Tire support plate 62 is mounted to side rails 38, 40, and includes support surface 64, which provides a resting surface for the spare tire 5. Threaded nut 65 is welded or otherwise secured to support plate 62 adjacent aperture 63. Alternatively, aperture 63 may be threaded by tapping as is common practice. Bolt or threaded rod 66 having holddown bar 68 is threaded through nut 65 and aperture 63 in order to secure spare tire 5 to support plate 62 of subframe 36.

Subframe 36 is mounted to front rail 18 by securing the vertical hanger 46 of each side rail 38, 40 to the slots 32, 34, respectively, in front rail 18. As shown in FIG. 6, with the "L" shaped catch 52 of each vertical hanger 46 is positioned in slots 32, 34. Hanger 46 and thus subframe 36 are free to pivot relative to front rail 18 as shown by reference arrows A in FIGS. 5 and 6. In normal operation, the weight of the rearward portion of subframe 36 is carried by load bearing portion 50 of hanger 46, which rests on front rail 18. End or tip 57 of "L" shaped catch 52 prevents subframe 36 from inadvertently disengaging from front rail 18, such as when the trailer 14 hits a bump in the road.

In operation, subframe 36 of tire carrier 10 is lowered from the raised position shown in FIG. 3 to the lowered position shown in FIG. 5 by grasping handle 54 and moving the top portion of handle 54 away from battery rack 22 towards the rear of trailer 12 as is shown in FIG. 4. In the process, slot 56 becomes disengaged from loop 26, so that subframe 36 is free to swing downwardly to the lowered position, with the forward ends 42 of side rails 38, 40 resting on the ground. In the lowered position, a spare tire 5 is placed on support surface 64 of support plate 62, so that threaded rod 66 is positioned through the aperture in the center of the rim or wheel of tire 5. Typically, a portion of tire 5 rests on each of members 38, 40 as well. Hold down bar 68 is threaded through nut 65 and tightened until the ends of bar 68 press against the wheel or the sidewalls of spare tire 5, which firmly secures tire 5 to plate 62 and presses tire 5 against members 38 and 40. The spare tire 5 may be removed from carrier 10 by reversing the above process. Using handle 54, the operator raises subframe 36 holding the spare tire 5 to the raised position, and positions slot 56 on handle 54 in engagement with loop 26 on battery rack 22. A locking pin, padlock, or similar device 31 may be inserted through loop 26 to retain handle 54 in firm engagement with loop 26. In most applications, when the tire carrier 10 is in the raised position, a portion of spare tire 5 is hidden or obscured by the forward portion of body or shell 13 of trailer 14. In such situations, it is difficult if not impossible to extract spare tire 5 from carrier 10 without first placing subframe 36 in the lowered position.

Figure 7:
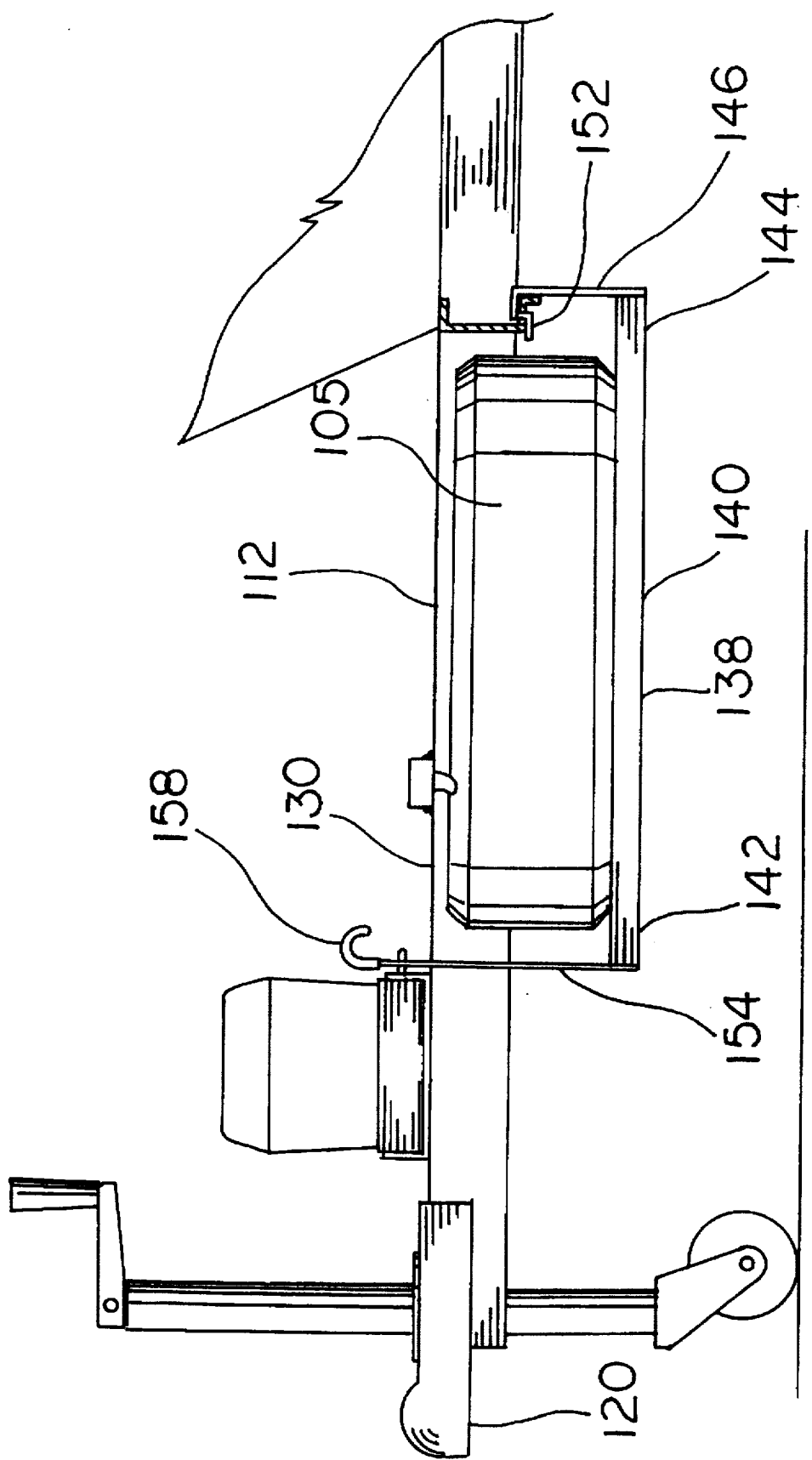
FIG. 7 is a fragmentary elevational view, partly in section, similar to FIG. 3 but showing an alternate embodiment for the tire hold down bar.
Figure 7A:
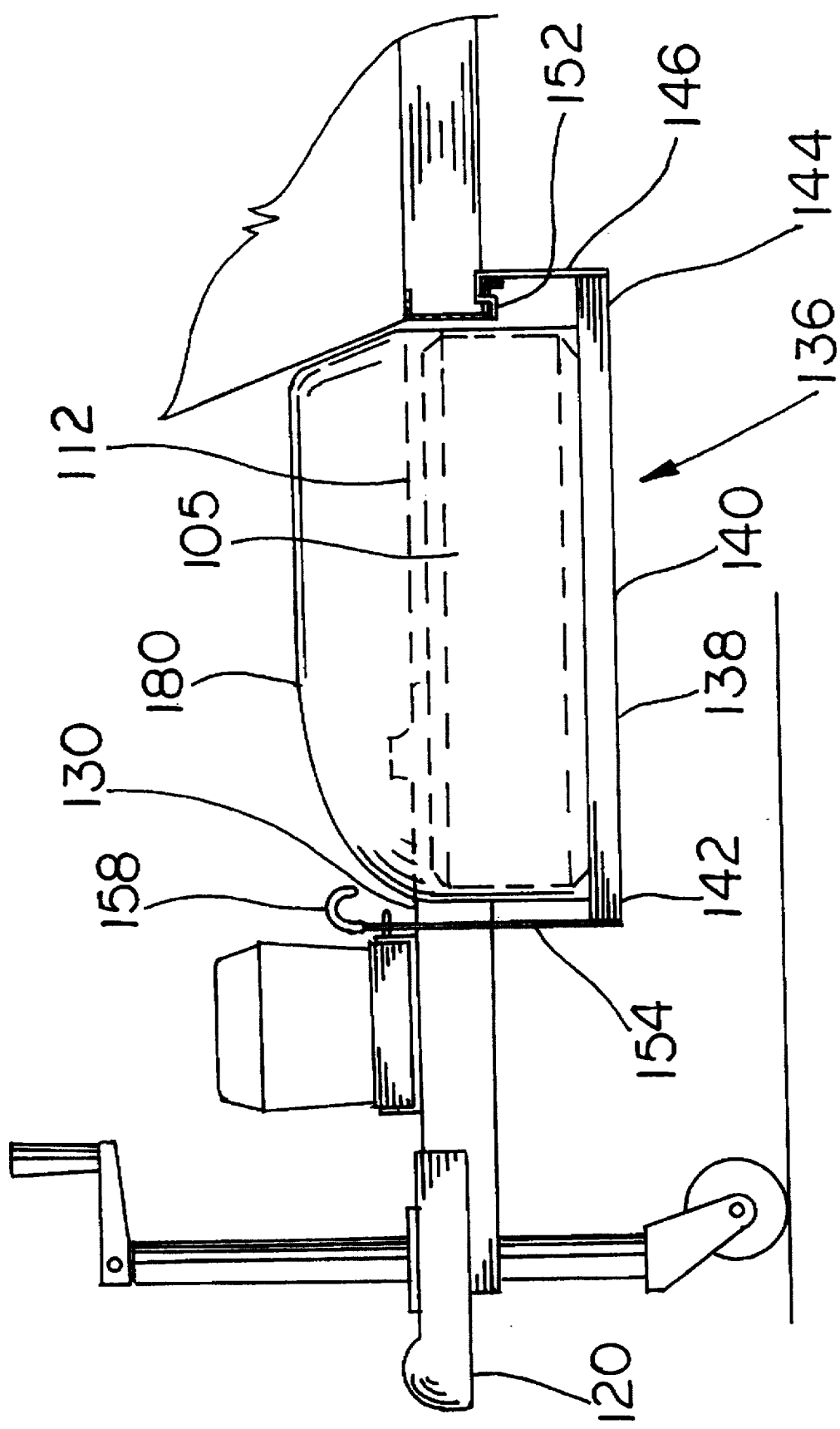
FIG. 7A is a fragmentary elevational view, partly in section, similar to FIG. 7 but showing an optional tire cover installed over the spare tire.
Figure 8:
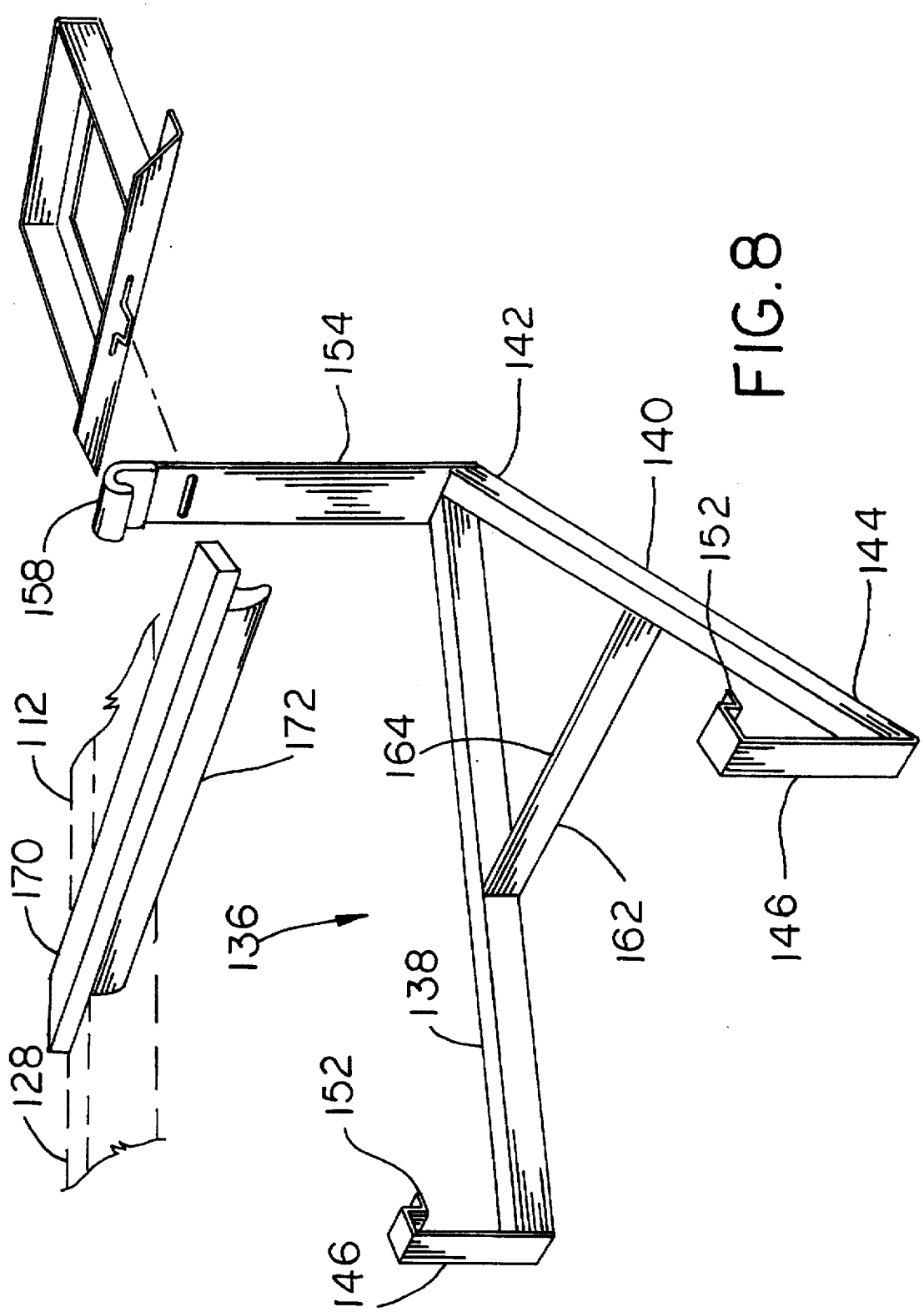
FIG. 8 is a fragmentary view in perspective of the alternate embodiment for the hold down bar shown in FIG. 7.

FIGS. 7, 7A and 8 illustrate an alternate embodiment for the tire hold down bar assembly, in which the elements are the same or substantially the same as those in the embodiment described above and retain the same reference characters, but increased by 100. Subframe 136 includes a pair of side rails 138, 140, each of which includes a forward portion 142 and a rearward portion 144. The forward portions 142 of side rails 138, 140 are joined together, while the rearward portions 144 are spaced apart, so that side rails 138, 140 form a substantially triangular shape, and side rails 128, 130 of frame 112 converge and are joined together at hitch 120. Each side rail 138, 140 has attached to its rearward end 144 a hanger 146 extending vertically upward, and an "L" shaped lip or catch 152 of each hanger 146 engages front rail 118 in the manner described for the embodiment shown in FIGS. 1 through 6. Handle 154 having gripping portion 158 is joined to forward ends 142 of side rails 138, 140, in the manner described above. Tire support member 162 is mounted to side rails 138, 140, and includes support surface 164, which provides a resting surface for the spare tire 105. Tire support member 162 spans the distance between side rails 138, 140, and includes support surface 164. Hold down bar 170 spans the distance between side rails 128, 130, and the lower edge of hold down bar 170 preferably includes a resilient member 172 attached thereto. Accordingly, with subframe 136 in the raised position of FIG. 7, spare tire 105 abuts the resilient member 172 of hold down bar 170, thus securing spare tire 105 by pressing spare tire 105 against members 138 and 140. Additionally, a cover 180 can be positioned over tire 105 to provide further protection and can be secured to rack 136 or frame 112 using conventional methods.

It will be appreciated that the foregoing is presented by way of illustration only, and not by way of any limitation, and that various alternatives and modifications may be made to the illustrated embodiment without departing from the spirit and scope of the invention.

What is claimed:

1. On a towable vehicle having a frame, a tire carrier for carrying a spare tire comprising:

a subframe pivotably attached to the frame, said subframe being moveable between a storage position and a load position;

a handle attached to said subframe for moving said subframe between said storage and load positions, said handle including engagement means for engaging the frame for securing said subframe in said storage position; and tire carrying means carried by said subframe for carrying a spare tire on said subframe, said subframe including a pivot end for engagement with the frame, said pivot end including a hanger having a load bearing portion for bearing a portion of the load carried by said subframe on the frame, said load bearing portion terminating in an angled retaining lip for maintaining said pivot end in engagement with the frame yet allowing said subframe to pivot relative to the frame.

2. The device of claim 1, wherein said handle includes biasing means for maintaining said handle in engagement with the frame thereby maintaining said subframe in said storage position.

3. The device of claim 1, wherein the frame includes a pair of slots, and said retaining lip on each said hanger is inserted in said slots in the frame.

4. The device of claim 1, wherein said tire carrying means includes a member carried by the frame, the spare tire being in abutment with said member when said subframe is in said storage position.

5. The device of claim 4, wherein said member includes resilient means for resiliently urging the spare tire against said subframe.

6. The device of claim 1, wherein said tire carrying means includes a support plate spanning said subframe for supporting the spare tire, and attachment means carried by said support plate for securing the spare tire to the support plate.

7. The device of claim 6, wherein said attachment means includes a threaded aperture in said support plate, and a threaded rod for insertion through the wheel of the spare tie and through said aperture in engagement with said threads, one end of said threaded rod including a holddown bar substantially perpendicular to said rod for engaging the spare tire.

8. The device of claim 6, wherein said attachment means includes a threaded rod mounted to said mounting plate substantially perpendicular to said plate for placement through the wheel of the spare tire, and a threaded holddown bar for engaging said threaded rod for engaging the spare tire.

9. The device of claim 1, wherein said engagement means includes an aperture in said handle and further includes a catch mounted on the frame, said aperture being sized to engage said catch, so that when said subframe is in said storage position said aperture engages said catch.

10. The device of claims 9, wherein said catch includes an extension that protrudes through said aperture, said extension including an opening, and locking means for insertion through said opening for locking said catch in said aperture, thereby maintaining said subframe in said storage position.

11. The device of claim 10, wherein said locking device is a locking pin.

12. The device of claim 10, wherein said locking device is a padlock.

13. On a towable vehicle having a frame, a tire carrier for carrying a spare tire comprising:

a subframe pivotably attached to the frame, said subframe being moveable between a storage position and a load position;

a handle attached to said subframe for moving said subframe between said storage and load positions, said handle including engagement means for engaging the frame for securing said subframe in said storage position; and tire carrying means carried by said subframe for carrying a spare tire on said subframe;

wherein said handle includes biasing means for maintaining said handle in engagement with the frame thereby maintaining said subframe in said storage position.

14. The device of claim 13 wherein said tire carrying means includes a member carried by the frame, the spare tire being in abutment with said member when said subframe is in said storage position.

15. The device of claim 14 wherein said member includes resilient means for resiliently urging the spare tire against said subframe.

16. The device of claim 13 wherein said tire carrying means includes a support plate spanning said subframe for supporting the spare tire, and attachment means carried by said support plate for securing the spare tire to the support plate.

17. The device of claim 16 wherein said attachment means includes a threaded aperture in said support plate, and a threaded rod for insertion through the wheel of the spare tie and through said aperture in engagement with said threads, one end of said threaded rod including a holddown bar substantially perpendicular to said rod for engaging the spare tire.

18. The device of claim 16 wherein said attachment means includes a threaded rod mounted to said mounting plate substantially perpendicular to said plate for placement through the wheel of the spare tire, and a threaded holddown bar for engaging said threaded rod for engaging the spare tire.

19. The device of claim 13 wherein said engagement means includes an aperture in said handle and further includes a catch mounted on the frame, said aperture being sized to engage said catch, so that when said subframe is in said storage position said aperture engages said catch.

20. The device of claim 19 wherein said catch includes an extension that protrudes through said aperture, said extension including an opening, and locking means for insertion through said opening for locking said catch in said aperture, thereby maintaining said subframe in said storage position.

21. The device of claim 20 wherein said locking device is a locking pin.

22. The device of claim 20 wherein said locking device is a padlock.

23. The device of claim 20 wherein said subframe includes a pivot end for engagement with the frame, said pivot end including a hanger having a load bearing portion for bearing a portion of the load carried by said subframe on the frame, said load bearing portion terminating in an angled retaining lip for maintaining said pivot end in engagement with the frame yet allowing said subframe to pivot relative to the frame.

24. The device of claim 23, wherein the frame includes a pair of slots, and said retaining lip on each said hanger is inserted in said slots in the frame.

25. On a towable vehicle having a frame, a tire carrier for carrying a spare tire comprising:

a subframe pivotably attached to said frame, said subframe being moveable between a storage position and a load position;

a handle attached to said subframe for moving said subframe between said storage and load positions, said handle including engagement means for engaging the frame for securing said subframe in said storage position;

tire carrying means carried by said subframe for carrying a spare tire on said subframe; and a member carried by the frame, the spare tire being in abutment with said member when said subframe is in said storage position, said member including resilient means for resiliently urging the spare tire against said subframe.

26. The device of claim 25 wherein said tire carrying means includes a support plate spanning said subframe for supporting the spare tire, and attachment means carried by said support plate for securing the spare tire to the support plate.

27. The device of claim 26 wherein said attachment means includes a threaded aperture in said support plate, and a threaded rod for insertion through the wheel of the spare tie and through said aperture in engagement with said threads, one end of said threaded rod including a holddown bar substantially perpendicular to said rod for engaging the spare tire.

28. The device of claim 26 wherein said attachment means includes a threaded rod mounted to said mounting plate substantially perpendicular to said plate for placement through the wheel of the spare tire, and a threaded holddown bar for engaging said threaded rod for engaging the spare tire.

29. The device of claim 25 wherein said engagement means includes an aperture in said handle and further includes a catch mounted on the frame, said aperture being sized to engage said catch, so that when said subframe is in said storage position said aperture engages said catch.

30. The device of claim 29 wherein said handle includes biasing means for maintaining said handle in engagement with the frame thereby maintaining said subframe in said storage position.

31. The device of claim 29 wherein said catch includes an extension that protrudes through said aperture, said extension including an opening, and locking means for insertion through said opening for locking said catch in said aperture, thereby maintaining said subframe in said storage position.

32. The device of claim 31 wherein said locking device is a locking pin.

33. The device of claim 31 wherein said locking device is a padlock.

34. The device of claim 25 wherein said subframe includes a pivot end for engagement with the frame, said pivot end including a hanger having a load bearing portion for bearing a portion of the load carried by said subframe on the frame, said load bearing portion terminating in an angled retaining lip for maintaining said pivot end in engagement with the frame yet allowing said subframe to pivot relative to the frame.

35. The device of claim 34 wherein the frame includes a pair of slots, and said retaining lip on each said hanger is inserted in said slots in the frame.

* * * * *

UNITED STATES PATENT AND TRADEMARK OFFICE
CERTIFICATE OF CORRECTION

PATENT NO. : 5,755,365

DATED : May 26, 1998

INVENTOR(S) : John D. Rentfrow et al.

It is certified that error appears in the above-identified patent and that said Letters Patent is hereby corrected as shown below:

Claim 7, Col. 6, Line 49, delete "tie" and insert --tire--.
Claim 17, Col. 7, Line 37, delete "tie" and insert --tire--.
Claim 27, Col. 8, Line 28, delete "tie" and insert --tire--.

Signed and Sealed this

Fifth Day of January, 1999

Attest:

*Attesting Officer*

*Acting Commissioner of Patents and Trademarks*